United States Patent
Alvarsson et al.

(10) Patent No.: US 7,766,403 B2
(45) Date of Patent: Aug. 3, 2010

(54) ARRANGEMENT FOR UNDERRUN PROTECTION FOR A VEHICLE

(75) Inventors: Billy Alvarsson, Olsfors (SE); Daniel Adin, Alingsas (SE)

(73) Assignee: Volvo Lastvagnar AB, Gotebörg (SE)

( * ) Notice: Subject to any disclaimer, the term of this patent is extended or adjusted under 35 U.S.C. 154(b) by 185 days.

(21) Appl. No.: 12/281,642

(22) PCT Filed: Mar. 6, 2006

(86) PCT No.: PCT/SE2006/000286

§ 371 (c)(1),
(2), (4) Date: Sep. 4, 2008

(87) PCT Pub. No.: WO2007/102755

PCT Pub. Date: Sep. 13, 2007

(65) Prior Publication Data

US 2009/0134643 A1    May 28, 2009

(51) Int. Cl.
B60R 19/34 (2006.01)
(52) U.S. Cl. ...................................... 293/133; 293/134
(58) Field of Classification Search ............ 296/187.09, 296/187.03; 293/133, 134, 102, 120, 132, 293/136, 122; 180/274; 267/116; 213/223, 213/8
See application file for complete search history.

(56) References Cited

U.S. PATENT DOCUMENTS

| | | | | |
|---|---|---|---|---|
| 2,508,347 A * | 5/1950 | Marsh | ......................... | 29/434 |
| 3,538,785 A | 11/1970 | Grancon | | |
| 3,804,446 A * | 4/1974 | Warrener | ..................... | 293/134 |
| 3,847,426 A | 11/1974 | McGettigan | | |
| 3,887,224 A * | 6/1975 | Browne | ..................... | 293/134 |
| 3,899,047 A * | 8/1975 | Maeda et al. | ............... | 188/374 |
| 3,912,295 A * | 10/1975 | Eggert, Jr. | ................... | 280/784 |
| 4,059,304 A * | 11/1977 | Yamanaka | ................. | 296/35.2 |
| 4,181,198 A * | 1/1980 | Lindberg | ..................... | 188/371 |
| 4,531,619 A * | 7/1985 | Eckels | ........................ | 188/371 |

(Continued)

FOREIGN PATENT DOCUMENTS

DE    94199691 U1    5/1995

(Continued)

OTHER PUBLICATIONS

International Search Report for corresponding International Application PCT/SE2006/000286.

(Continued)

*Primary Examiner*—Kiran B. Patel
(74) *Attorney, Agent, or Firm*—WRB-IP LLP (57) ABSTRACT

An underrun protection arrangement for a vehicle having a frame includes an impact element arranged in a position that corresponds to an anticipated impact from a force in the event of a collision with another vehicle, and at least one energy-absorbing connecting element which connects the impact element to the frame and which is designed to be compressed in the event of the collision. The connecting element includes an outer section and an inner section which are telescopically arranged so that displacement of the outer section in relation to the inner section may occur upon the impact while energy is absorbed, the connecting element also including an energy-absorbing unit arranged to be compressed while absorbing energy during the displacement.

13 Claims, 9 Drawing Sheets

U.S. PATENT DOCUMENTS

| | | | | | |
|---|---|---|---|---|---|
| 4,624,493 | A | * | 11/1986 | Hillebrand et al. | 293/136 |
| 4,913,268 | A | * | 4/1990 | Parker et al. | 188/322.19 |
| 5,443,146 | A | * | 8/1995 | Ayyildiz et al. | 188/374 |
| 6,062,355 | A | * | 5/2000 | Nohr et al. | 188/374 |
| 6,231,095 | B1 | * | 5/2001 | Chou et al. | 293/133 |
| 6,854,574 | B2 | * | 2/2005 | Yoshida et al. | 188/371 |
| 7,192,067 | B2 | * | 3/2007 | Hansen | 293/133 |
| 2007/0236025 | A1 | * | 10/2007 | Glasgow et al. | 293/133 |

FOREIGN PATENT DOCUMENTS

| | | |
|---|---|---|
| DE | 10130637 A1 | 1/2003 |
| DE | 10252175 A1 | 5/2004 |
| EP | 0546352 A | 6/1993 |
| EP | 0557733 A1 | 9/1993 |
| GB | 1193616 A | 6/1970 |
| WO | 0039479 A | 7/2000 |
| WO | 02081264 A1 | 10/2002 |

OTHER PUBLICATIONS

International Preliminary Examination Report for corresponding International Application PCT/SE2006/000286.

Supplementary European Search Report for corresponding application EP 06 71 6972.

* cited by examiner

ARRANGEMENT FOR UNDERRUN PROTECTION FOR A VEHICLE

BACKGROUND AND SUMMARY

The present invention relates to an underrun protection arrangement for a vehicle having a frame, comprising an impact element arranged in a position that corresponds to an anticipated impact from a force in the event of a collision with another vehicle, and at least one energy-absorbing connecting element which connects the impact element to the frame and which is designed to be compressed in the event of said collision.

Larger motor vehicles, such as load-carrying commercial vehicles, are nowadays designed with relatively high ground clearance. One major reason for this is the need to be able to use the vehicle when driving on uneven ground, for example. Today's commercial vehicles normally have a ground clearance which at the front of the vehicle is in the order of 400 mm.

However, the fact that a commercial vehicle normally has a relatively high ground clearance constitutes a serious road safety risk. This is due to the fact that in any head-on collision between the commercial vehicle and a passenger car, there is a risk that the front section of the passenger car will penetrate under the front of the commercial vehicle and thus become wedged between the roadway and the front underside of the commercial vehicle. This can lead to the front of the commercial vehicle penetrating the passenger compartment of the passenger car with enormous force, which in turn may result in serious injuries to the occupants of the vehicle. In unfortunate cases, the commercial vehicle may even continue forwards and roll over the passenger car, which can obviously result in even more serious injuries.

Various solutions have been proposed for solving the above-mentioned problem. One solution is to provide the load-carrying commercial vehicle with a special underrun protection arrangement in the form of a reinforced structure, such as a force-absorbing beam element, which is arranged horizontally at the front of the commercial vehicle. More specifically, this beam element is arranged in a position that corresponds to a point of impact from an anticipated force in the event of a collision with a passenger car. By means of such an element, it is possible to prevent a passenger car penetrating under the front of the commercial vehicle in the event of a collision.

Furthermore, such an underrun protection arrangement can be arranged so as to absorb energy in the event of a force acting upon it during a collision. This further reduces the risk of serious injuries in the event of a collision.

It is previously known from the patent document U.S. Pat. No. 3,981,114 to use an energy-absorbing device in the form of a column arrangement to be used as an energy-absorbing device in an automobile bumper. To this end, the arrangement comprises two column elements in the form of a first column element which is arranged in a telescopic manner inside a second column element. Upon impact during a collision, the second column element will initially be collapsed. In a second phase during the collision, the second column element will be collapsed together with the first column element. As a result, a controlled collapse sequence can be obtained.

It can be noted that the previously known devices of the above-mentioned type are not arranged for providing a highly controlled energy absorption in an underrun protection arrangement. Such demands are in particular relevant in those cases which involve a passenger car colliding with a load-carrying commercial vehicle, where certain requirements exist regarding, for example, the energy absorption and deformation length of the underrun protection.

It is desirable to provide an improved energy-absorbing underrun protection arrangement for a load-carrying commercial vehicle, which in particular provides a highly controlled energy absorption under impact stress during a collision with a conventional car.

An arrangement of the above-mentioned type according to an aspect of the present invention is provided, wherein said connecting element comprises an outer section and an inner section which are telescopically arranged so that displacement of the outer section in relation to the inner section may occur upon said impact while energy is absorbed, said connecting element also comprising an energy-absorbing unit arranged to be compressed while absorbing energy during said displacement.

By means of an aspect of the invention, certain advantages can be obtained. For example, a force generated by an impact during a collision can be absorbed with a minimum risk of injury of the occupants of the passenger car, who are the ones most at risk of injury in the event of a collision between the passenger car and the commercial vehicle.

Furthermore, an aspect of the invention provides a high degree of controlled energy-absorption as a result of the above-mentioned telescopically arranged connecting element. In accordance with the invention, the energy absorption may take place during a relatively long telescopic displacement of the connecting element. Also, the invention may be arranged so that the connecting element is not telescopically displaced until the force acting on the impact element exceeds a predetermined threshold value. The controlled energy-absorption can thus be optimally adapted to the impact stress during an anticipated crash situation between a passenger car and a commercial vehicle.

It is also desirable to provide an improved energy-absorbing underrun protection which is adapted to offset collisions (i.e. in relation to the direction of travel of the vehicle). According to an aspect of the present invention, particular coupling elements can be provided which allow the connecting elements to pivot with respect to the impact element and the vehicle frame.

BRIEF DESCRIPTION OF THE DRAWINGS

The invention will now be described in more detail with reference to a preferred exemplary embodiment and to the drawings attached, in which.

DETAILED DESCRIPTION

Figure 1:
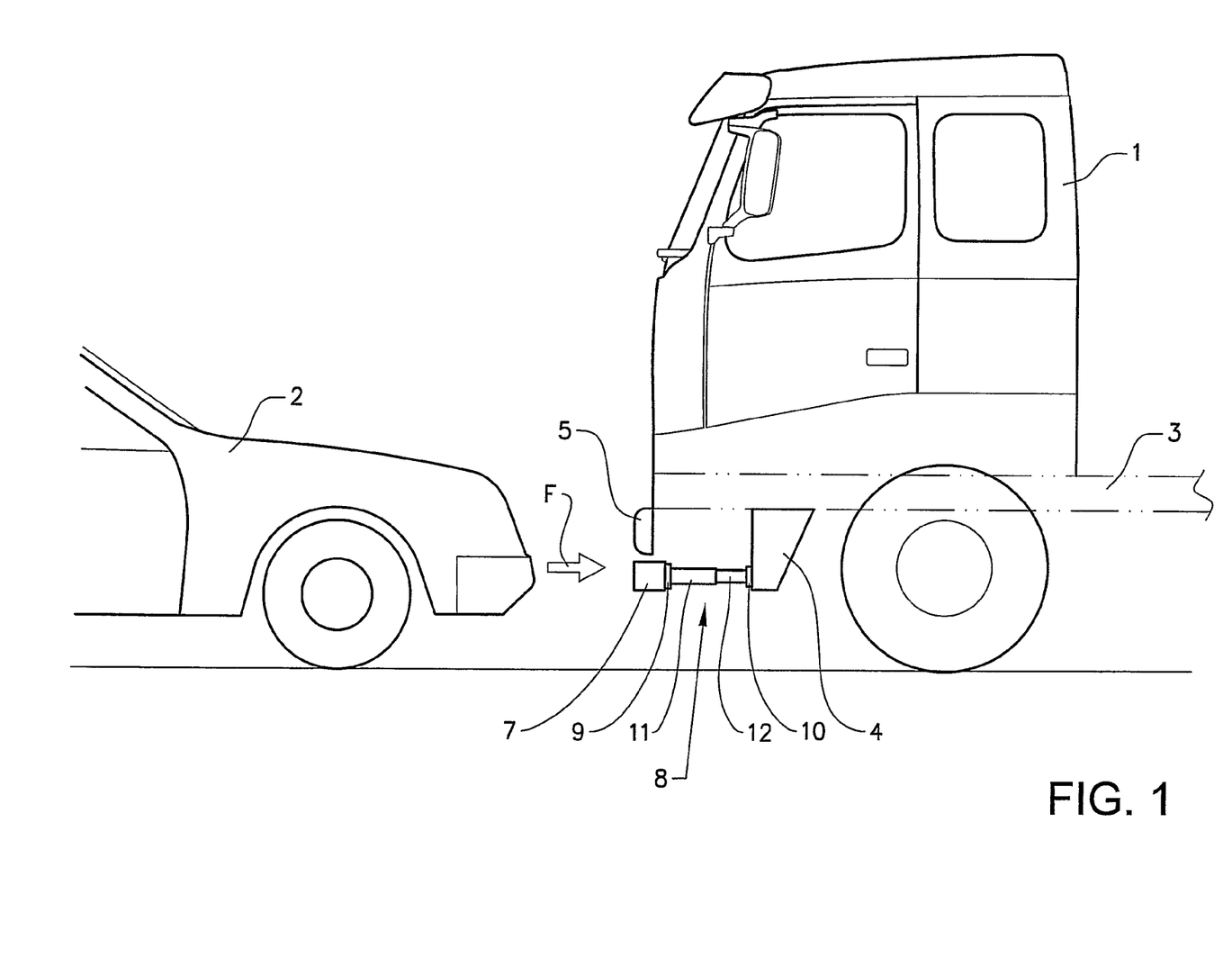
FIG. 1 shows a basic side view of a conventional car and a commercial load-carrying vehicle, wherein the latter is provided with an underrun protection arrangement according to the present invention.

The invention represents an underrun protection which is particularly, but not exclusively, intended for load-carrying commercial vehicles with a relatively high ground clearance. FIG. 1 is a somewhat simplified side view showing such a load-carrying commercial vehicle 1 which is provided with an arrangement according to the invention. Also shown in the figure is a conventional passenger car 2. It will be seen from the figure that a possible head-on collision between a passenger car and a commercial vehicle can lead to the passenger car becoming wedged fast between the commercial vehicle and the roadway, which can lead to serious injuries in particular to occupants of the passenger car 2. A basic object of an aspect of the present invention is to prevent such a situation arising. A particular object of an aspect of the invention is to provide an accurately controlled energy absorption in the event of a collision between the car 2 and the commercial vehicle 1.

The commercial vehicle 1 is of conventional construction with a frame, which in turn comprises two longitudinal frame members, only one frame member 3 of which can be seen from FIG. 1. Each frame member 3 extends essentially in the longitudinal direction of the commercial vehicle 1, up to the front section of said vehicle 1. According to a preferred embodiment of the invention, a front bracket 4 is fixed to the front part of each frame member 3, preferably the underside of said frame member 3. Only one of these two front brackets 4 can be seen from FIG. 1. A bumper 5 is furthermore conventionally arranged extending horizontally across the front section of the commercial vehicle 1. The bumper 5 is fixed to the frame member 3.

In order to prevent the above-mentioned situation in which the passenger car 2 penetrates under the front of the commercial vehicle 1 in a possible head-on collision or offset collision (the term "offset collision" here referring to a collision in which the longitudinal axis of symmetry of the passenger car is displaced somewhat parallel to the longitudinal axis of symmetry of the commercial vehicle), the commercial vehicle 1 is provided with an underrun protection arrangement. According to the embodiment, this underrun protection arrangement comprises an impact element 7 in the form of a cross-beam extending essentially horizontally and transversely to the longitudinal direction of the commercial vehicle 1, in the front section thereof. This cross-beam 7 is preferably made of steel or other suitable material and has an essentially rectangular (or alternatively square) cross-section. The cross-beam 7 is furthermore arranged in the commercial vehicle 1 at a height corresponding to certain predetermined ground clearance. Also indicated in FIG. 1 is an arrow representing, in a schematical manner, a force F which acts on the cross-beam 7 in the event of a collision.

The ground clearance of the cross-beam 7 may be defined as the distance from the underlying roadway to the underside of the cross-beam 7. As stated above, this distance must be selected according to the required vehicle accessibility on uneven ground and, where applicable, in accordance with prevailing statutory requirements. For conventional commercial vehicles, the ground clearance is normally in the order of less than or equal to 400 mm.

According to the embodiment, the underrun protection arrangement also comprises two energy-absorbing connecting elements 8 (only one of which can be seen from FIG. 1), which are fixed between each front bracket 4 and the cross-beam 7. In this manner, the cross-beam 7 is moveably suspended in relation to the frame 3. Each connecting elements 8 comprises a front portion 9, an end portion 10 and a tubular, telescopic arrangement with a first, outer section in the form of an outer tube 11 and a second, inner section in the form of an inner tube 12. The design and function of the connecting element 8, in particular as regards the telescopic arrangement, will be described in greater detail below.

Furthermore, the front portion 9 and the end portion 10 serve as mounting devices for fastening the connecting elements 8 between each front bracket 4 and the cross-beam 7. According to the preferred embodiment, and as will be described in greater detail below, the front portion 9 and the end portion 10 are in the form of particular spherical coupling elements which allow a certain amount of movement between each connecting element 8 with respect to its corresponding front bracket 4 and the cross-beam 7.

Figure 2:
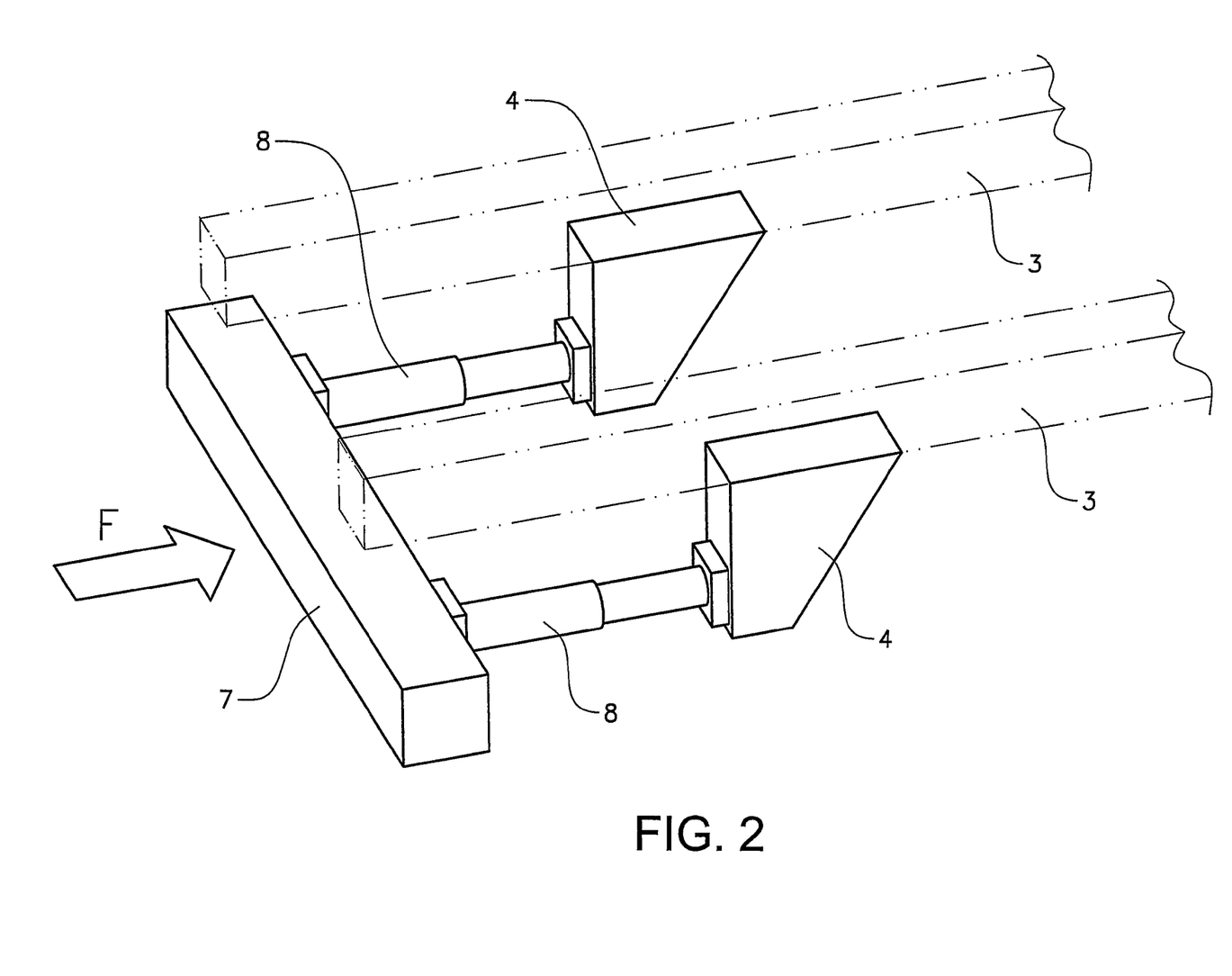
FIG. 2 is a simplified perspective view of an underrun protection arrangement in accordance with a preferred embodiment of the invention.

FIG. 2 shows a simplified perspective view of an underrun protection arrangement in accordance with a preferred embodiment of the invention, i.e. comprising the cross-beam 7 and the connecting elements 8 which are connected to the brackets 4. Each bracket 4 is in turn mounted on the underside of a corresponding frame member 3. The brackets 4 are shown in a simplified manner, and it is obvious that such elements can be designed in various ways in order to provide a means for mounting of the two connecting elements 8.

In the event of a collision between the commercial vehicle and the passenger car, the cross-beam 7 will be acted upon by a large force F. This force F will be transmitted to each front bracket 4 via each connecting element 8, the force being absorbed by the frame structure 3 of the vehicle 1.

The main structure and function of the energy-absorbing connecting elements 8 will now be described in detail with reference initially to FIG. 3, which is a detailed side view showing the design and function of the above-mentioned connecting element 8 with its telescopic arrangement which in turn comprises the outer tube 11 and the inner tube 12. The view shown in FIG. 3 indicates the above-mentioned front portion 9 and end portion 10 (cf. FIG. 1) in the form of two particular coupling elements which will be described in greater detail below.

Figure 3:
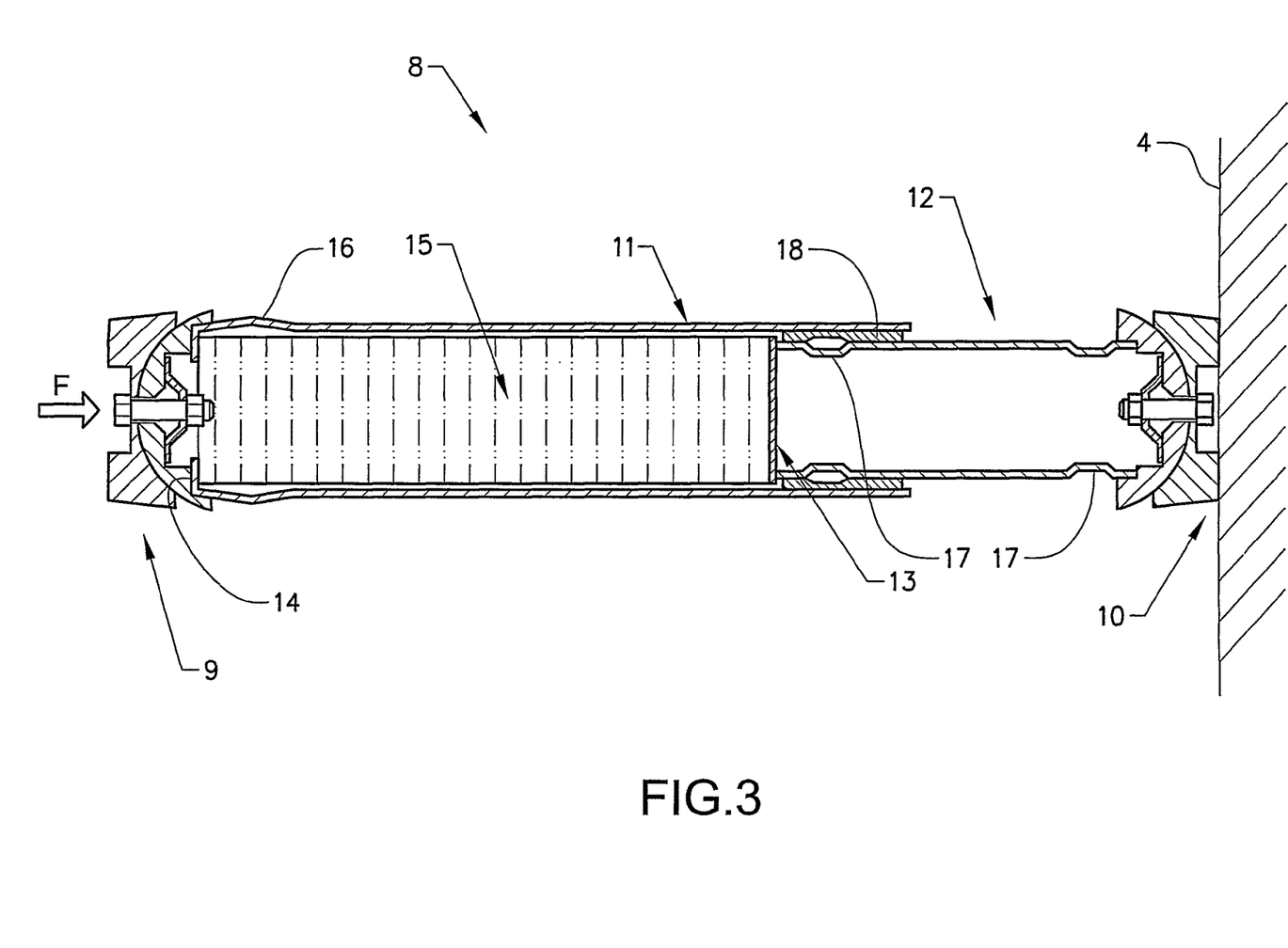
FIG. 3 is a more detailed sideview of an energy-absorbing connecting element forming part of the underrun protection arrangement according to the invention, in an initial condition in which it is not influenced by any force.

Also, as shown schematically in FIG. 3 with an arrow, it is assumed that a force F may act against the connecting element 8. However, FIG. 3 shows the coupling element 8 in an initial condition in which this force F is zero, i.e. no collision has yet occurred. Furthermore, the mounting of the connecting element 8 with reference to a corresponding front bracket 4 is shown in a schematical manner in FIG. 3.

The term "tube" is here used to denote components, i.e. the inner tube 12 and the outer tube 11, which have a generally cylindrical and tubular shape. However, the invention is not limited to such designs only, but can be implemented with energy-absorbing connecting elements having inner and outer sections being designed with, for example, a circular, square or rectangular cross-section, or any other suitable cross-section design. Also, as will be described below, the outer tube 11 and the inner tube 12 according to the invention are arranged to be displaced in relation to each other along a common longitudinal direction and are also individually compressible in the longitudinal direction. This means that the entire connecting element 8 can be forced to decrease its length during a collision, as will be described below.

With reference to FIG. 3, it can be noted that the outer tube 11 has an inner diameter which is slightly larger than the outer diameter of the inner tube 12. This means that the inner tube 12 and outer tube 11 define two overlapping sections wherein the outer tube 11 may be forced to be displaced in a telescopic manner with reference to the inner tube 12, i.e. in a direction towards the right as regarded in FIG. 3. In other words, the outer tube 11 is allowed to slide on the outside of the inner tube 12 while energy is absorbed According to the embodiment, the wall of the outer tube 11 has a thickness which preferably is approximately 2 mm, whereas the wall of the inner tube 12 has a thickness which preferably is approximately 3 mm. This means that the inner tube 12 can be said to be of higher strength than the outer tube 11 as regards its resistance to longitudinal compression. The total length being defined between the front portion 9 and the end portion 10 is approximately 400-500 mm, the outer tube 11 preferably being longer than the inner tube 10 as indicated in FIG. 3. It should however be noted that the invention is not limited to any particular dimensions, but can be implemented in various ways depending on the type of commercial vehicle, expected impact forces, requirements regarding the amount of energy to be absorbed, available mounting space in the commercial vehicle and other factors.

Furthermore, the inner tube 12 is provided with a relatively thin end cap 13 forming a plate-shaped end element of the inner tube 12. In a corresponding manner, the outer tube 11 is provided with a further end cap 14, generally designed as a ring-shaped or annular element. This means that an internal space is defined between the end caps 13, 14, which space accommodates an energy-absorbing unit 15 which is suitably in the form of a generally tubular block made of energy-absorbing honeycomb material. Such a material, which is previously known as such, can for example be manufactured by corrugated sheets of aluminium which are formed as a block having a shape and size which fits in the space between the end caps 13, 14. As will be described in detail below, such an energy-absorbing unit 15 may be used so as to be compressed while absorbing energy while at the same time the outer tube 11 is forced in a telescopic manner in a direction towards the inner tube 12.

Furthermore, the outer tube 11 is preferably designed with a peripheral projection 16 or protuberance extending along the circumference of the outer tube 11. In accordance with the embodiment, this projection 16 is positioned relatively close to the outer end of the outer tube 11, i.e. the end which is closest to the front portion 9. The projection 16 is in the form of a section of the wall of the outer tube 11 which is outwardly facing and designed with a slightly greater outer diameter than the remaining section of the outer tube 11. The purpose of this projection 16 is to aid during longitudinal compression of the outer tube 11 in the event of a collision so that such compression takes place in a controlled and predictable manner.

Figure 4:
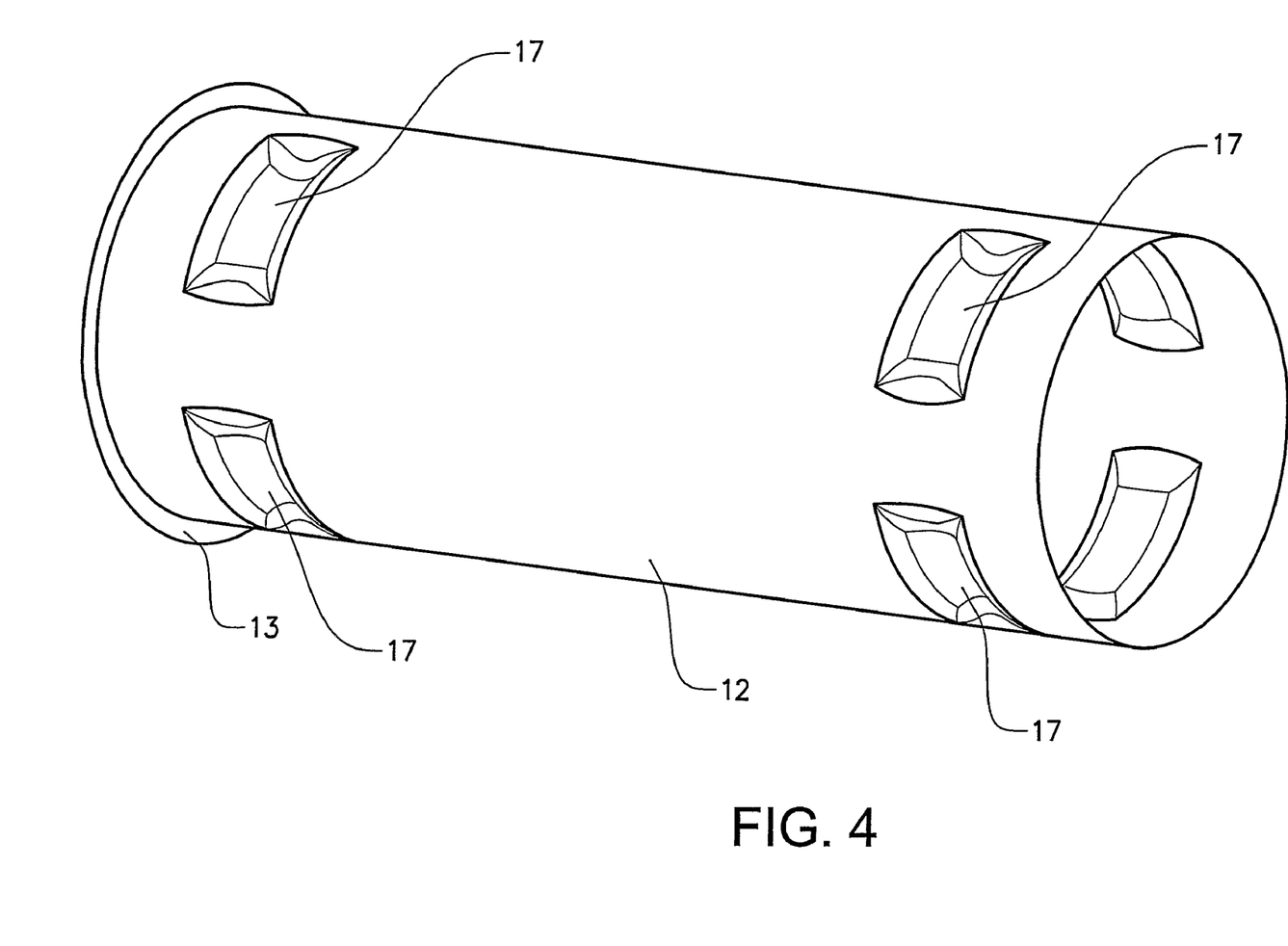
FIG. 4 is a separate and more detailed perspective view of an inner tube forming part of the invention.

Also, as shown separately in FIG. 4, the inner tube 12 is preferably formed as a cylinder having a certain number of inwardly projecting elements 17. Preferably, these elements 17 do not extend around the entire periphery of the inner tube 12 but are formed as a number of relatively short sections along said periphery. The purpose of these elements 17 is to aid during longitudinal compression of the inner tube 12 in the event of a collision, so as to allow the inner tube 12 to be compressed in a controlled manner. One or more of the inwardly projecting elements 17 are preferably positioned near the outer end of the inner tube 12 and one or more of the projecting elements 17 are preferably positioned near the inner end of the inner tube 12.

With reference to FIG. 3 again, it can be noted that the coupling element 8 furthermore comprises a generally tubular bushing 18 which is preferably made of suitable plastics material. The bushing 18 is positioned in a concentric manner around the outer end of the inner tube 12, i.e. so that it is positioned between the outer periphery of the inner tube 12 and the inside of the outer tube 11. The purpose of the bushing 18 is to control the telescopic displacement of the outer tube 11 in relation to the inner tube 12 during compression.

Figure 5:
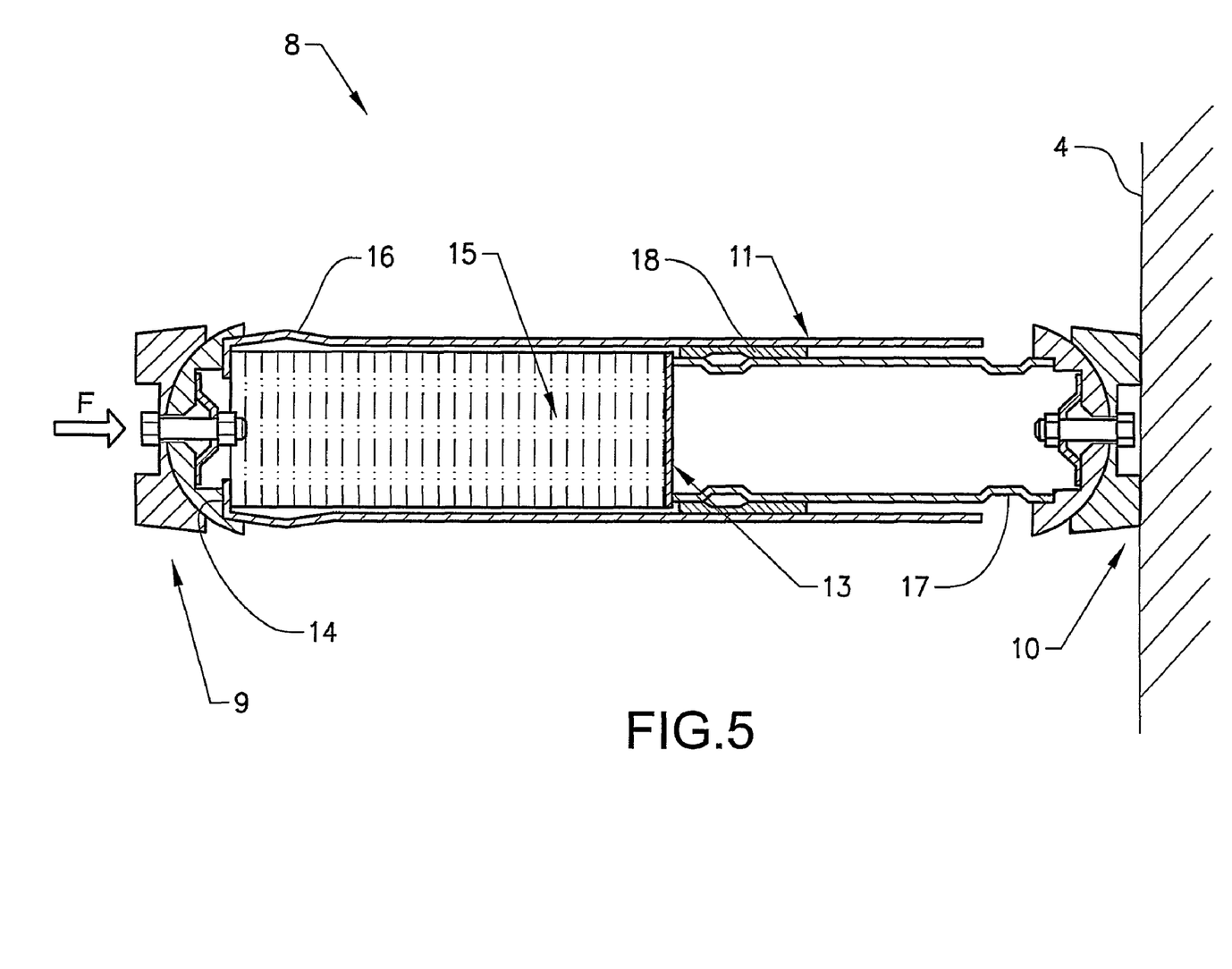
FIG. 5 is a view corresponding to FIG. 3 but showing the arrangement according to the invention in a first operating condition during a collision.

FIG. 5 shows an arrangement corresponding to FIG. 3, but in a first operating condition during a collision, wherein a large force F is actually acting upon the outer tube 11. This force F is here intended to indicate that a collision takes place between the commercial vehicle 1 and the car 2. Such a force F will initially force the outer tube 11 so as to be displaced in a telescopic manner in relation to the inner tube 12 (towards the right in FIG. 5), while the energy-absorbing unit 15 is gradually compressed while still being positioned inside the outer tube 11, i.e. between the two end caps 13, 14. Consequently, FIG. 5 shows the energy-absorbing unit 15 in a more compressed condition than FIG. 3.

The outer tube 11, inner tube 12 and the energy-absorbing unit 15 are designed so that—in the event of a collision situation as described above—the compression of the energy-absorbing unit 15 is initiated at a force F which is approximately of the magnitude 200 kN. This threshold value can suitably be defined as an anticipated stress in the event of a collision with the car 2 after its own front deformation zones or crumple zones in the car body cannot absorb more energy. In other words, during a collision, the deformation zones in the car 2 will at first start to absorb energy while being deformed. When these deformation zones cannot generally be deformed any more, the compression of the energy-absorbing unit 15 in the coupling element 8 will be initiated.

Figure 6:
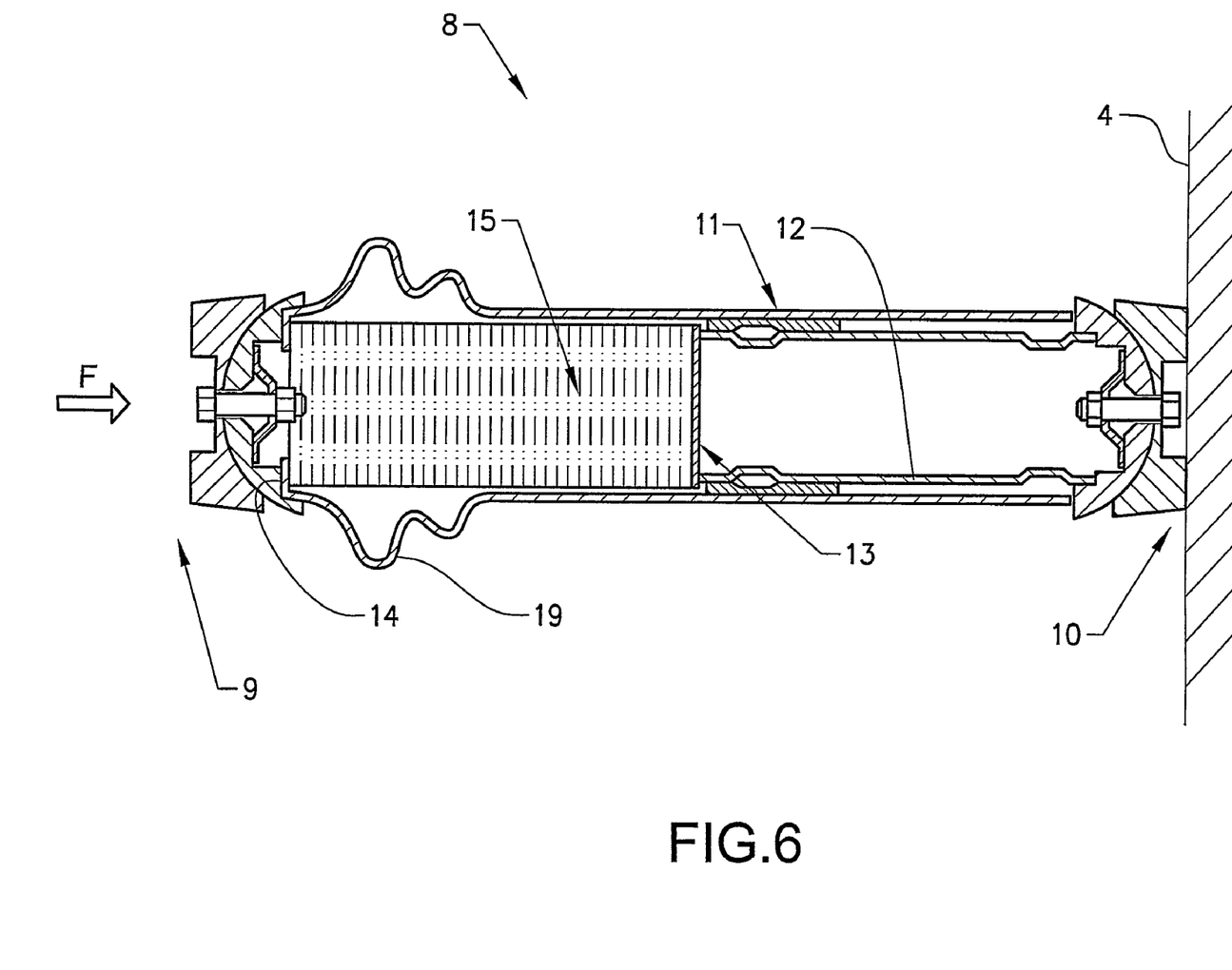
FIG. 6 is a view of the arrangement according to the invention in a second operating condition during a collision.

FIG. 6 shows an arrangement corresponding to FIGS. 3 and 5, but in a second operating condition during a collision wherein the force F is still acting upon the outer tube 11. In this situation, the material in the energy-absorbing unit 15 is partly compressed and the outer tube 11 has reached a stop position corresponding to an end position at the end portion 10 where it cannot be displaced any further without being longitudinally compressed. If a high force F is still acting on the outer tube 11, the outer tube 11 will now start to be longitudinally compressed, which is shown in FIG. 6 by means of a slightly crumpled end portion 19 of the outer tube 11. This crumpled end portion 18 will be formed near the outer end of the outer tube 11, which is due to the positioning and design of the peripheral projection 16 which was described above with reference to FIG. 3.

During the phase shown in FIG. 6, the material in the energy-absorbing unit 15 and the outer tube 11 are compressed simultaneously, assuming that the force F still acts on the connecting element 8. Due to the fact that the inner tube 12 is stronger than the outer tube 11 as regards its resistance to longitudinal compression, the outer tube 11 will be compressed whereas the inner tube 12 will not be compressed at this stage.

Figure 7:
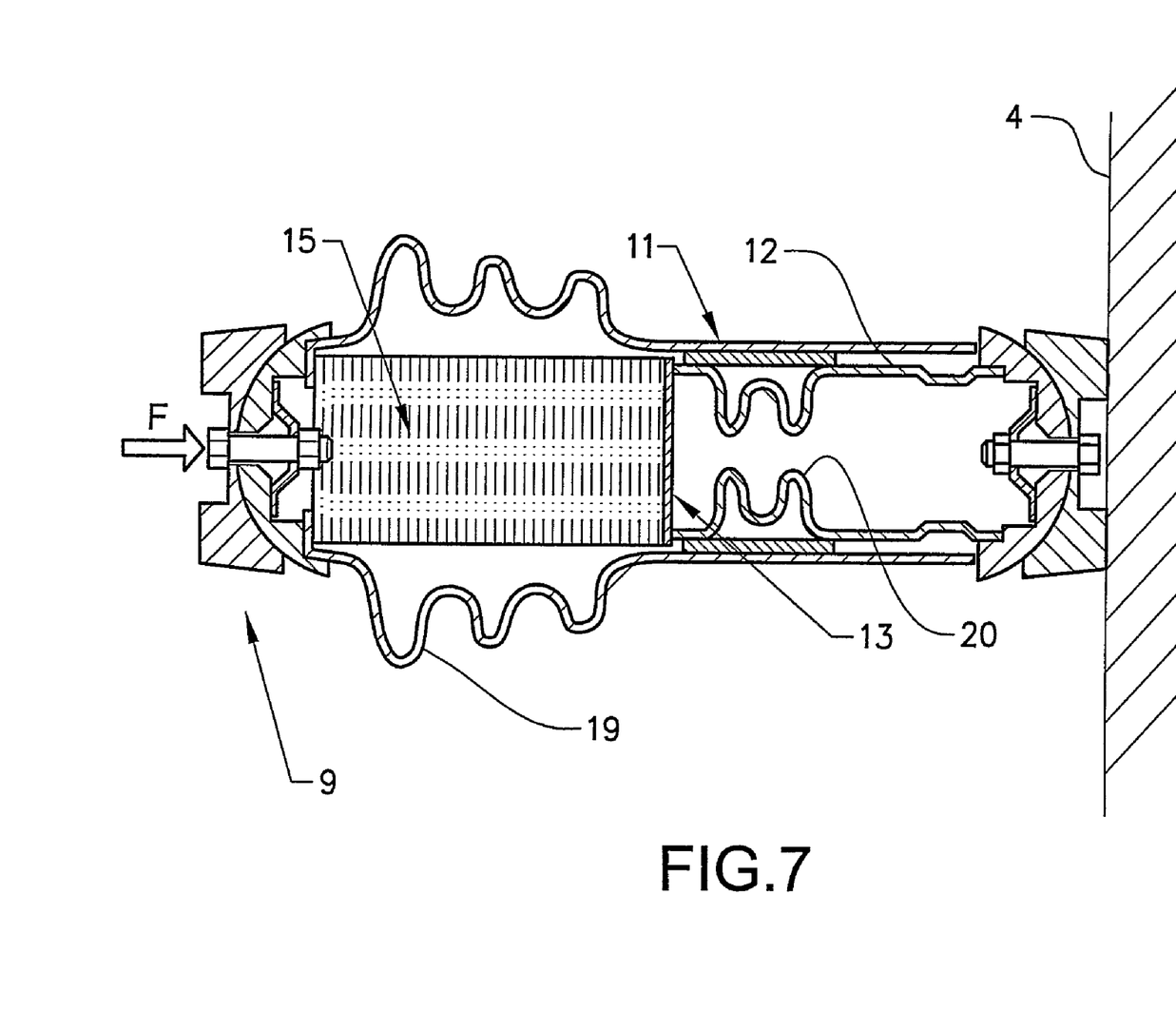
FIG. 7 is a view of the arrangement according to the invention in a third operating condition during a collision.

Finally, the material in the energy-absorbing unit 15 cannot be compressed any further. FIG. 7 shows an arrangement according to the embodiment at such a stage, i.e. corresponding to FIGS. 3, 5 and 6 but in a third operating condition wherein the force F is still acting upon the outer tube 11. At this stage, the energy-absorbing unit 15 cannot be compressed any further, which means that compression of the inner tube 12 in the longitudinal direction will be initiated. This is indicated in FIG. 6 by means of a further crumpled section 20 inside the inner tube 12. More precisely, it can be noted that during this stage, the inner tube 12 and the outer tube 11 will be compressed simultaneously a further distance.

According to an optional stage which is not described in the drawings, the end cap 13 of the inner tube 12 can be dimensioned so that the honeycomb material in the energy-absorbing unit 15 deforms and breaks through the end cap 13 of the inner tube 12. This may occur if the force F is still acting on the connecting element after the inner tube 12 has been compressed generally completely. This means that the outer tube 11 can be displaced a further distance (towards the right in the drawing) while energy is absorbed as a result of the material of the energy-absorbing unit 15 being forced through the end cap 13 and into the inner tube 12.

During an initial stage of a collision between the commercial vehicle and the passenger car, it is desirable that the cross-beam 7 should function as an essentially inelastic, rigid barrier. During the initial course of a collision, the front crumple zones which are normally present in modern passenger cars are deformed with the absorption of energy. In this way, the energy which is developed in the initial stage of the collision will be largely absorbed through this deformation of the passenger car crumple zones. However, if the force F acting on the cross-beam 7 exceeds a certain threshold level, preferably approximately 200 kN, the cross-beam 7 is displaced while energy is absorbed by means of the telescopic operation of the connecting elements 8 as described above. This may correspond to a situation when the crumple zones in the passenger car have been compressed generally completely and are no longer capable of making any significant contribution to the energy absorption, which normally means that the cross-beam 7 has reached certain components in the passenger car such as its engine or gearbox. An increase in the stress acting on the cross-beam 7 then occurs. The fact that the crossbeam 7 and the brackets 4 absorb the force F in the event of stress applied by the passenger car 2 therefore prevents the passenger car 2 from penetrating between the commercial vehicle 1 and the roadway during this situation.

Figure 8:
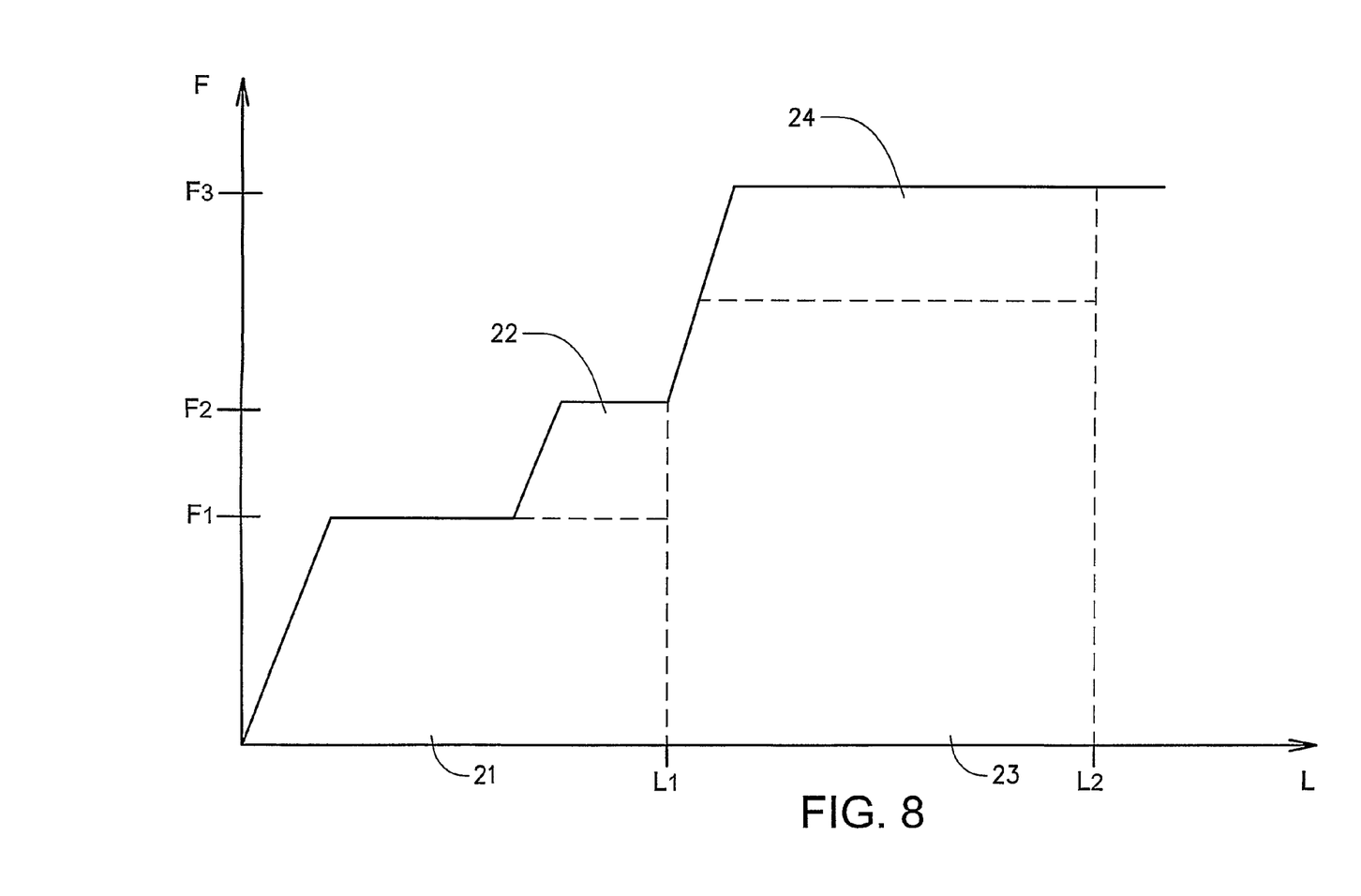
FIG. 8 is a graph showing the absorption of energy during a collision sequence, as obtained by means of the invention.

FIG. 8 shows a graph of a sequence of energy absorption during a collision between the commercial vehicle 1 and the car 2. The x-axis of the graph corresponds to the deformation length L, i.e. the displacement distance of the cross-beam 7 during a collision due to the longitudinal compression of the connecting elements 8. The y-axis of the graph represents the level of force F at which the various stages of compression of each connecting element 8 (cf. FIGS. 3, 5, 6 and 7) are initiated.

As indicated in FIG. 8 with reference numeral 21, a certain zone within the graph can be said to represent compression of the energy-absorbing unit 15 as described above with reference to FIG. 5. If the force F acting on the cross-beam 7 exceeds a certain level F1 (at which the energy-absorbing unit 15 starts to compress), said unit 15 will be compressed while the cross-beam 7 is displaced. When the cross-beam 7 has been displaced a certain distance 1_i, no further compression of the energy-absorbing unit 15 is possible. Also, if the force F acting on the cross-beam 7 exceeds a further, higher level of force F2, the outer tube 11 will also start to be compressed, as described above primarily with reference to FIG. 6. This is indicated by means of a zone having the reference numeral 22. Consequently, and as indicated in the graph of FIG. 8, an initial stage in which only the energy-absorbing unit 15 is compressed will be followed by a second stage in which the energy-absorbing unit 15 and outer tube 11 are compressed simultaneously.

With further reference to FIG. 8, it can be noted that if the force F acting on the cross-beam 7 exceeds a further level F3, the inner tube 12 will be compressed, as described above primarily with reference to FIG. 7. This is indicated in FIG. 8 by means of a further zone 23. It should be noted that during this stage when the inner tube 12 is compressed, the outer tube 11 is also compressed simultaneously. This is indicated in FIG. 8 by means of a further zone 24.

In summary, the invention provides a generally linear progression with longitudinal compression of each connecting element 8 which involves a highly controlled energy-absorption. In a typical design to be used in an otherwise conventional commercial vehicle, the threshold levels F-i, F2 and F3 are of the magnitude 200 kN, 300 kN and 500 kN, respectively. Furthermore, in order to obtain the even progression of the energy-absorption shown in FIG. 8, the dimensions and properties of the inner tube 12, the outer tube 11 and the energy-absorbing element 15 are adapted in a predetermined manner. Suitably, the embodiment described above comprises an inner tube 12 having an outer diameter which is approximately 110 mm and a wall thickness which is approximately 3 mm. The outer tube 11 preferably has an outer diameter which is approximately 112 mm and a wall thickness which is approximately 2 mm. However, the invention is not limited to these dimensions only.

Furthermore, after an entire compression sequence as described, the crossbeam 7 has been displaced a distance which is approximately 400-500 mm during energy-absorption. In order to obtain this, the energy-absorbing element 15 is first compressed approximately one third of this total distance. Then the outer tube 11 is compressed approximately one third of the total distance, wherein the energy-absorbing element 15 is further compressed during a part of this stage. Finally, the inner tube 12 is compressed approximately one third of the total distance, wherein the outer tube 11 is further compressed during this last stage.

Figure 9:
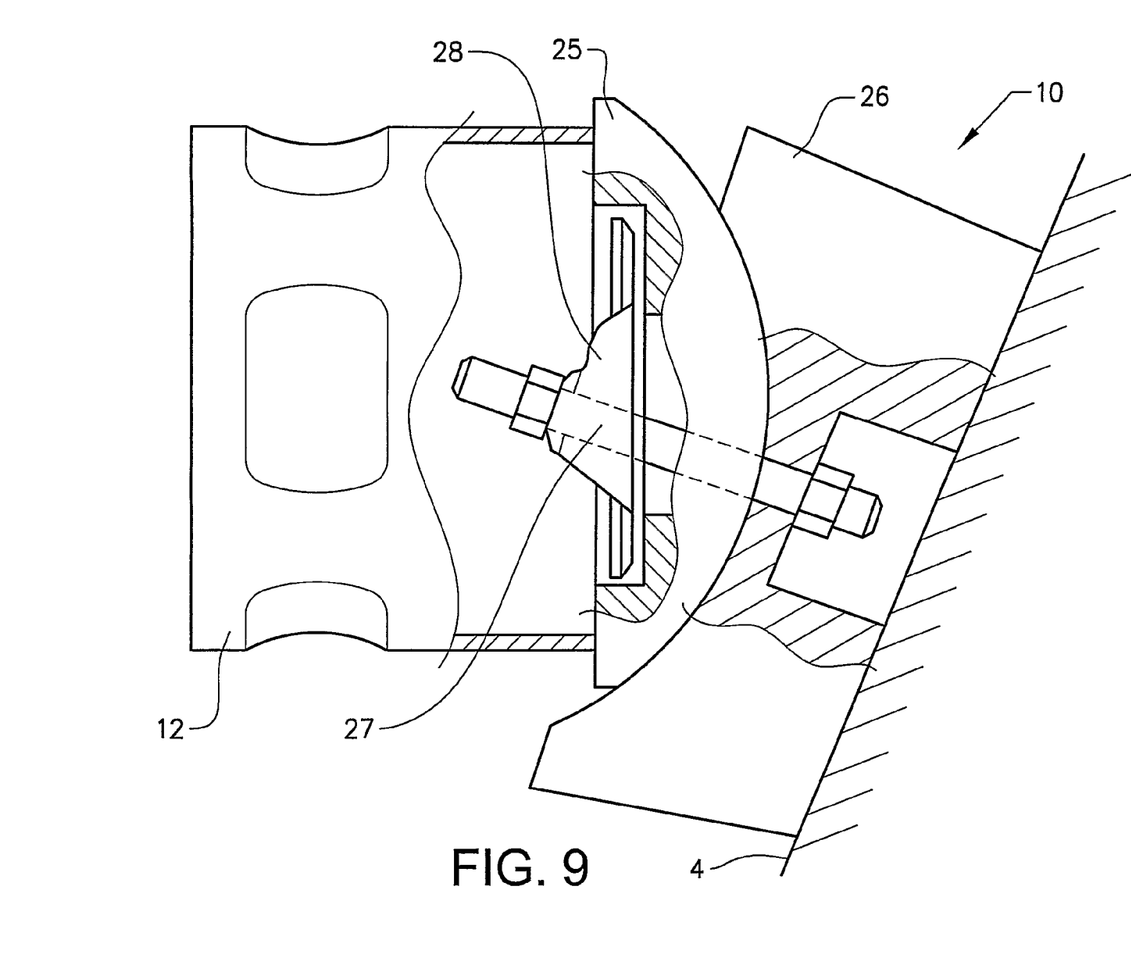
FIG. 9 is a sideview of a coupling element which is used for mounting an underrun protection arrangement according to a preferred embodiment of the invention.

With reference to FIG. 9, a coupling element 10 according to a preferred embodiment is described. This coupling element 10 was described briefly above and shown in FIGS. 3, 5, 6 and 7. It should be noted that the design and function of both of the coupling elements 9 and 10 are generally the same. Also, FIG. 9 is a view from above indicating that the inner tube 12 can be positioned slightly angled with respect to the coupling element 10, which in turn is mounted in a fixed manner in the front bracket 4. In order to allow a movement so as to assume this angled position, the coupling element 10 is arranged as a spherical joint which allows a rotating movement of the inner tube 12 in relation to the front bracket 4. To this end, the coupling element 10 comprises two main parts, i.e. a first, generally dome-shaped element 25 and a second, generally bowl-shaped element 26. The first element 25 is mounted on the end of the inner tube 12 and the second element 26 is mounted on the front bracket 4.

The dome-shaped element 25 and the bowl-shaped element 26 are connected by means of a fastening element which is preferably in the form of a conventional screw 27, which extends through a centre portion of said elements 25, 26. The screw 27 is mounted via a bowl washer 28 which is mounted inside the dome-shaped element 25, i.e. facing the end portion of the inner tube 12. The bowl washer 28 is adapted to be deformed in order to allow a rotational movement of the screw 27, and consequently also a rotational movement of the bowl-shaped element 26. The force which is needed to deform the bowl washer 28 is relatively low, which means that the operation of the connecting elements 8 is not disturbed. Consequently, the connecting element 8 can be positioned in various positions with respect to the front bracket 4. This is an advantage with the invention, since it allows the controlled energy absorption according to the invention even if the force F acting on the cross-beam 7 is not directed straight onto said cross-beam 7. It should be noted that a particular type of collision, the so-called offset collision, often leads to this situation, i.e. where the cross-beam 7 is forced in an angled manner with respect to the frame structure of the vehicle in question.

The invention is not limited to the embodiment described above, but may be modified without departing from the scope of the claims below. For example, the invention can in principle be used in all types of vehicle such as trucks, loaders and busses, in which a relatively high ground clearance is desirable. The invention is therefore not limited to use in commercial vehicles of the type described above.

The invention can furthermore in principle be used as an underrun protection that is arranged on the rear end section of a vehicle or along the sides thereof. Finally, the front brackets 4 and connecting elements 8 may be two or more in number.

With regard to the choice of material, the connecting elements 8 and the front brackets 4 are preferably made of steel whilst the impact element 7 is preferably of steel, aluminium or other suitable material.

The limit at which the movement of the impact element 7 described above is permitted can be defined so that it corresponds to a situation in which the crumple zones in the passenger car have essentially been completely deformed. The invention is not limited to such a choice of limit, however, but can be implemented in a manner where the limit is generally set to a value commensurate with the passenger car having absorbed a certain amount of energy.

The invention claimed is:

1. Underrun protection arrangement for a vehicle having a frame, comprising an impact element arranged in a position that corresponds to an anticipated impact from a force in the event of a collision with another vehicle, and at least one energy-absorbing connecting element which connects the impact element to the frame and which is designed to be compressed in the event of the collision, wherein the connecting element comprises an outer section and an inner section which are telescopically arranged so that displacement of the outer section in relation to the Inner section may occur upon the impact while energy is absorbed, the connecting element also comprising an energy-absorbing unit arranged to be compressed while absorbing energy during the displacement, and wherein, during a collision, the energy-absorbing element is first compressed during telescopic displacement of the outer section in relation to the inner section, after which a compression of the outer section is initiated, after which a compression of the inner section is initiated.

2. Arrangement according to claim 1, wherein the outer section and the inner section are of generally tubular, cylindrical shape.

3. Arrangement according to claim 1, wherein the energy-absorbing unit is accommodated inside the outer section.

4. Arrangement according to claim 1, wherein compression of the energy-absorbing element is initiated if the force acting on the impact element exceeds a predetermined first threshold value.

5. Arrangement according to claim 4, wherein said the first threshold value is defined as an anticipated stress in the event of a collision with a passenger car following complete compression of crumple zones provided in the passenger car.

6. Arrangement according to claim 4, wherein the compression of the outer tube is initiated if the force acting on the impact element exceeds a predetermined second threshold value.

7. Arrangement according to claim 6, wherein the compression of the inner tube is initiated if the force acting on the impact element exceeds a predetermined third threshold value.

8. Arrangement according to claim 1 comprising two connecting elements connecting the impact element to the frame.

9. Arrangement according to claim 1, comprising a bushing between an inside of the outer section and an outside of the inner section, in order to control longitudinal displacement of the outer section in relation, to the inner section.

10. Arrangement according to claim 1, wherein the outer element is provided with an outwardly facing peripheral projection extending along its circumference, for controlling the longitudinal compression of the outer element upon impact.

11. Arrangement according to claim 1, wherein the inner element is provided with at least one peripheral inwardly facing projecting element extending along its circumference for controlling the longitudinal compression of the inner element upon impact.

12. Arrangement according to claim 1, wherein the connecting element is mounted in the impact element and the frame via two coupling elements each having a generally dome-shaped element cooperating with a generally bowl-shaped element allowing the connecting element to pivot with respect to the impact element and the frame, respectively.

13. Vehicle comprising the arrangement according to any of the preceding claims.

* * * * *